(12) United States Patent
Victoria et al.

(10) Patent No.: US 12,504,100 B2
(45) Date of Patent: Dec. 23, 2025

(54) MOBILE ANTI-ROTATION FEATURE FOR MODULAR BRACKET

(71) Applicant: GM GLOBAL TECHNOLOGY OPERATIONS LLC, Detroit, MI (US)

(72) Inventors: Christian Reyes Victoria, Ocoyoacac (MX); Jesus Reyes Garcia, Zinacantepec (MX); Everardo Daleth Adan Mariaca, Puente de Ixtla (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 18/519,547

(22) Filed: Nov. 27, 2023

(65) Prior Publication Data

US 2025/0172224 A1    May 29, 2025

(51) Int. Cl.
*F16L 3/123*    (2006.01)

(52) U.S. Cl.
CPC .................................. *F16L 3/123* (2013.01)

(58) Field of Classification Search
CPC . F16L 3/2431; F16L 3/243; F16L 3/24; F16L 3/1091; F16L 3/1075; F16L 3/123
See application file for complete search history.

(56) References Cited

U.S. PATENT DOCUMENTS

| | | | | |
|---|---|---|---|---|
| 2,790,614 A | * | 4/1957 | Miller | F16L 3/1233 248/74.1 |
| 2,956,103 A | * | 10/1960 | Steel | F16L 3/1091 174/40 R |
| 3,099,054 A | * | 7/1963 | Spiro | F16L 3/1236 248/74.3 |
| 3,169,004 A | * | 2/1965 | Rapata | F16B 2/08 248/74.5 |
| 3,632,070 A | * | 1/1972 | Thayer | F16L 3/233 248/68.1 |
| 5,129,607 A | * | 7/1992 | Satoh | F16L 3/13 248/74.2 |
| 5,230,488 A | * | 7/1993 | Condon | F16L 3/12 248/74.1 |
| 5,267,710 A | * | 12/1993 | Condon | F16L 3/24 248/65 |
| 5,489,173 A | * | 2/1996 | Hofle | F16B 37/046 411/85 |
| 5,655,865 A | * | 8/1997 | Plank | F16B 37/045 403/258 |

(Continued)

FOREIGN PATENT DOCUMENTS

| | | | | |
|---|---|---|---|---|
| DE | 102017125851 A1 | * | 5/2019 | |
| GB | 2130077 A | * | 5/1984 | ............ F16L 3/1075 |
| GB | 2157508 A | * | 10/1985 | .............. F16L 3/237 |

*Primary Examiner* — Eret C Mcnichols
(74) *Attorney, Agent, or Firm* — Ingrassia Fisher & Lorenz, LLP | IF&L

(57) ABSTRACT

A number of variations may include a product including a bracket including at least two separate parts including a base body bracket and a mobile anti-rotation feature or post, wherein the base body bracket includes a base body portion and a bracket portion, and wherein the base body portion includes a plurality of through holes formed therein, and wherein the mobile anti-rotation feature or post may be inserted into one of the plurality of through holes depending upon the mounting location of the bracket.

20 Claims, 6 Drawing Sheets

(56) References Cited

U.S. PATENT DOCUMENTS

| | | | | |
|---|---|---|---|---|
| 6,209,827 B1* | 4/2001 | Kawai | F16B 21/02 | 248/74.3 |
| 6,405,826 B1* | 6/2002 | Bass | F01N 13/1822 | 248/62 |
| 6,443,403 B1* | 9/2002 | Page | H02G 3/32 | 248/68.1 |
| 6,669,149 B2* | 12/2003 | Akizuki | H02G 3/26 | 248/222.12 |
| 7,010,210 B2* | 3/2006 | Dufour | G02B 6/44765 | 385/136 |
| 7,191,990 B2* | 3/2007 | Hutter, III | B64C 1/406 | 248/316.4 |
| 7,549,613 B1* | 6/2009 | Ismert | F16L 3/085 | 248/73 |
| 8,161,605 B2* | 4/2012 | Reichel | F16L 3/1233 | 248/74.1 |
| 8,561,950 B2* | 10/2013 | Li | H02G 3/32 | 248/74.1 |
| 8,678,332 B2* | 3/2014 | Benthien | B64C 1/406 | 248/205.3 |
| 8,844,888 B1* | 9/2014 | Gretz | F16L 3/2431 | 403/348 |
| 9,022,712 B2* | 5/2015 | Klopfenstein, II | F16B 21/04 | 411/549 |
| 9,062,813 B2* | 6/2015 | Army | F16M 13/00 | |
| 9,083,169 B2* | 7/2015 | James | F16B 37/043 | |
| 9,188,247 B2* | 11/2015 | Pauchet | F16L 3/123 | |
| 9,653,901 B2* | 5/2017 | Miyamoto | F16B 21/16 | |
| 10,677,139 B2* | 6/2020 | Hadji | B60K 13/04 | |
| 11,355,905 B2* | 6/2022 | Toll | F16L 3/1058 | |
| 11,906,089 B2* | 2/2024 | Hargett | F16B 7/0493 | |
| 2005/0284995 A1* | 12/2005 | Hutter, III | F16B 37/044 | 248/235 |
| 2008/0017770 A1* | 1/2008 | Wood | H02G 3/266 | 248/226.11 |
| 2009/0283649 A1* | 11/2009 | Wood | H02G 3/266 | 248/205.3 |
| 2016/0138634 A1* | 5/2016 | Zhang | E04B 1/5812 | 52/698 |

* cited by examiner

MOBILE ANTI-ROTATION FEATURE FOR MODULAR BRACKET

INTRODUCTION

The technical field generally relates to brackets for receiving, supporting, or holding a vehicle component and methods of making and using the same.

BACKGROUND

Vehicles may include brackets for receiving or holding plumbing. Different brackets typically need to be used for plumbing in different locations in the same vehicle or for securing plumbing in different models or makes of vehicles.

Accordingly, it may be desirable to provide a common bracket with a mobile anti-rotational feature, for receiving, supporting, or holding a vehicle component, wherein the bracket may be used in different locations within the same vehicle or in different models or makes of vehicles. This may be achieved by having a mobile anti rotation feature and a base body bracket. Since the anti-rotation feature is not part of the bracket, there is no need to create new brackets to adapt to different locations as currently is needed.

SUMMARY

The following description of variants is only illustrative of components, elements, acts, products, and methods considered to be within the scope of the disclosure and are not in any way intended to limit such scope by what is specifically disclosed or not expressly set forth. The components, elements, acts, products, and methods as described herein may be combined and rearranged other than as expressly described herein and still are considered to be within the scope of the disclose.

Variation 1 may include a product including: a plumbing bracket including at least two separate parts including a base body bracket and a mobile anti-rotation feature or post, wherein the base body bracket includes a base body portion and a bracket portion, and wherein the base body portion includes a plurality of through holes formed therein, and wherein the mobile anti-rotation feature or post is constructed and arranged to be received in one of the plurality of through holes depending upon the mounting location of the bracket.

Variation 2 may include a product as set forth in Variation 1 wherein the base body portion includes a top face and opposite bottom face and a side extending therebetween, wherein the mobile anti-rotation feature or post is received in one of the plurality of through holes extends downwardly so that a portion of the mobile anti-rotation feature extends downwardly below the bottom face of the base body portion.

Variation 3 may include a product as set forth in any of Variations 1-2 wherein the base body portion includes a surface defining at least in part one of the through holes and forming at least one top feature positioned to engage a stop feature on the mobile anti-rotational feature or post, or a locking feature to mate with a locking feature on the mobile anti-rotation feature or post.

Variation 4 may include a product as set forth in Variation 2 wherein an outer edge of the top face and an outer edge of the bottom face each have a square shape, rectangle shape, rhombus shape, disc or circle shape, or elliptical shape.

Variation 5 may include a product as set forth in any of Variations 1-4 wherein the bracket portion includes an outer shell and an inner shell, and wherein the inner shell has a through hole formed therein for receiving a pipe or conduit.

Variation 6 may include a product as set forth in Variation 5 wherein the outer shell includes a plurality of arc-shaped segments, and at least one projection including a fin radially outward from one of the plurality of arc-shaped segments arc-shaped and a flange extending perpendicularly to the fin.

Variation 7 may include a product as set forth in Variations 1-6 wherein the bracket portion includes two pieces including a first piece and a second piece so that a pipe or conduit is receivable in the first piece, and the second piece is connectable to the first piece to securely hold the pipe or conduit.

Variation 8 may include a product as set forth in Variation 6 wherein the inner shell includes an inner surface having a plurality of ribs, wherein the plurality of ribs have a valley between adjacent ribs.

Variation 9 may include a product as set forth in any of Variations 1-8 wherein the mobile anti-rotation feature or post includes a base portion and a first flexible finger and a second flexible finger extending from the base portion, wherein the first flexible finger and the second flexible finger are spaced from each other to define a gap therebetween.

Variation 10 may include a product as set forth in Variation 9 wherein each of the first flexible finger and the second flexible finger has a front face connected to an inner face connected to a rear face connected to a side face, and each of the first flexible finger and second flexible finger includes a cap having a first end extending past the front face to form a first shoulder and the cap having a second end extending past the rear face to form a second shoulder.

Variation 11 may include a product as set forth in any of Variations 9-10 wherein the base body portion includes a shoulder formed in a surface defining one of the plurality of through holes positioned for engagement with one of the shoulders of the first flexible finger or the second flexible finger.

Variation 12 may include a product as set forth in Variations 7-11 wherein the first piece and second piece are connectable by at least one of locking features, adhesive, or welding.

Variation 13 may include a product as set forth in Variations 1-12 wherein the mobile anti-rotation feature or post and the base body portion include mating locking features so that the mobile anti-rotation feature or post is lockable in position with respect to the base body portion.

Variation 14 may include a product including: a bracket including at least two separate parts including a base body bracket and a mobile anti-rotation feature or post, wherein the base body bracket includes a base body portion and a bracket portion, and wherein the base body portion includes a plurality of through holes formed therein, and wherein the mobile anti-rotation feature or post is constructed and arranged to be received in one of the plurality of through holes depending upon the mounting location of the bracket; a pipe or conduit received in the bracket portion, and a vehicle support or frame, and wherein the mobile anti-rotation feature or post is positioned in one of the plurality of through holes, wherein a portion of the mobile anti-rotation feature or post engages a face of the vehicle support or frame, or extends through the vehicle support or frame.

Variation 15 may include a method including: providing a plurality of identical sets of a base body bracket and a mobile anti-rotation feature or post, and placing individual identical sets of the plurality of identical sets of the base body bracket and the mobile anti-rotation feature or post at different spaced apart positions along a component of a vehicle system, or placing a first set of the plurality of identical sets of the base body bracket and mobile anti-rotation feature or post at a position along a pipe or conduit of a first model of a first vehicle and placing a second set of the plurality of identical sets of base body bracket and mobile anti-rotation feature or post along another component of a second model of a second vehicle, wherein the first model and the second model are different.

Variation 16 may include a method as set forth in Variation 15 wherein the base body portion includes a top face and opposite bottom face and a side extending therebetween, wherein the mobile anti-rotation feature or post is received in one of the plurality of through holes extends downwardly so that a portion of the mobile anti-rotation feature extends downwardly below the bottom face of the base body portion.

Variation 17 may include a method as set forth in any of Variations 15-16 wherein the base body portion includes a surface defining at least in part one of the through holes and forming at least one of a stop feature position to engage a stop feature on the mobile anti-rotational feature or post, or a locking feature to mate with a locking feature on the mobile anti-rotation feature or post.

Variation 18 may include a method as set forth in any of Variations 15-17 wherein the bracket portion includes an outer shell and in an inner shell, and wherein the inner shell has a through hole formed therein for receiving a pipe or conduit.

Variation 19 may include a method as set forth in any of Variations 15-18 wherein the bracket portion includes two pieces including a first piece and a second piece so that a pipe or conduit is receivable in the first piece, and the second piece is connectable to the first piece to securely hold the pipe or conduit.

Variation 20 may include a method as set forth in any of Variations 15-19 wherein the mobile anti-rotation feature or post includes a base portion and a first flexible finger and a second flexible finger extending from the base portion, wherein the first flexible finger and the second flexible finger are spaced from each other to define a gap therebetween.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, summary, or the following detailed description.

Figure 1:
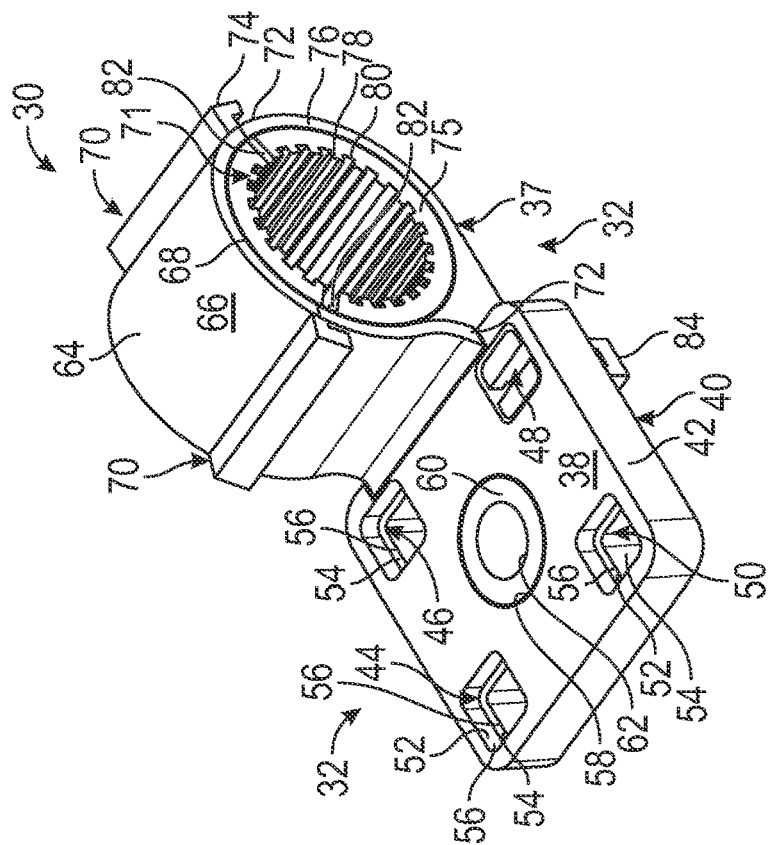
FIG. 1 is a perspective view of a base body bracket and a separate mobile anti-rotation feature according to a number of variations.

FIG. 1 illustrates a number of variations which may include a product 30 including a base body bracket 32 and a separate mobile anti-rotation feature or post 34. The base body bracket 32 may include a base body portion 36 and a bracket portion 37. The base body portion 36 may include a first or top face 38 and a second or bottom face 40 and a side face 42 extending therebetween. The top face 38 and bottom face 40 of the base body portion 36 may have any of a variety of configurations, for example, but not limited to, wherein an outer edge of the top face 38 and an outer edge of the bottom face 40 have a square shape, rectangle shape, rhombus shape, disc or circle shape, or elliptical shape. A plurality of through holes, for example, through holes 44, 46, 48, and 50 may be formed through the base body portion 36. Each one of the plurality of through holes 44, 46, 48, and 50 may be formed in part by a first wall 52 extending downward from the top face 38 and a second wall 54 extending upward from the bottom face 40 and a shoulder 56 joining each wall 52, 54. The shoulder 56 may provide a stop feature for engaging a stop feature on the mobile anti-rotation feature or post 34. A central through hole may be defined by wall 58 and a bushing 60 may be received therein. The bushing 60 may be a hollow cylinder having a through hole defined by an inner surface 62. The bushing 60 may receive a rod or bolt for supporting the base body bracket 32.

In a number of variations, the bracket portion 37 may include an outer shell 64 which may include a plurality of arc-shaped segments 66 and an inner surface 68 defining a through hole extending through the outer shell 64. A plurality of projections 70 may extend from at least one of the arc-shaped segments 66. The projections 70 may include a fin 72 extending radially outward from an arc-shaped segment 66. A flange 74 may extend perpendicularly from the fin 72. The outer shell 64 may be made from a variety of materials including, but not limited to, metal materials or polymeric materials. The bracket portion 37 may include an inner shell 75 having an elongated outer surface 76 which may be circular in cross-section. A through hole 71 may be formed in the inner shell 75 may be defined by an inner surface including a plurality of spaced apart ribs 78 separated by a valley 80. In a number of variations, at least one trench 82 may be formed and or through the inner shell 75. In a number of variations, the inner shell 75 may be made from a variety of materials, including, but not limited to, metal materials or polymeric materials. In a number of variations, the inner shell 75 may include a natural or synthetic elastomeric material. In a number of variations. The inner shell 75 may include a rubber or a synthetic foam elastomeric material.

Figure 2:
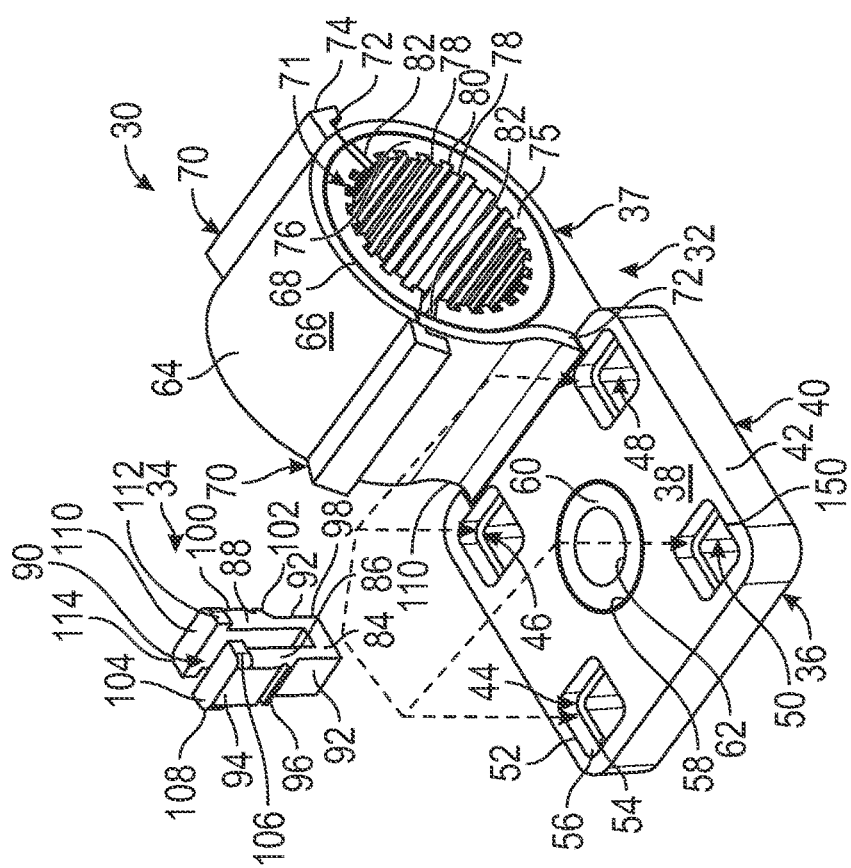
FIG. 2 is a perspective view of a base body bracket and a mobile anti-rotation feature or post inserted into one of a plurality of through holes formed in a base portion of the base body bracket according to a number of variations.
Figure 3:
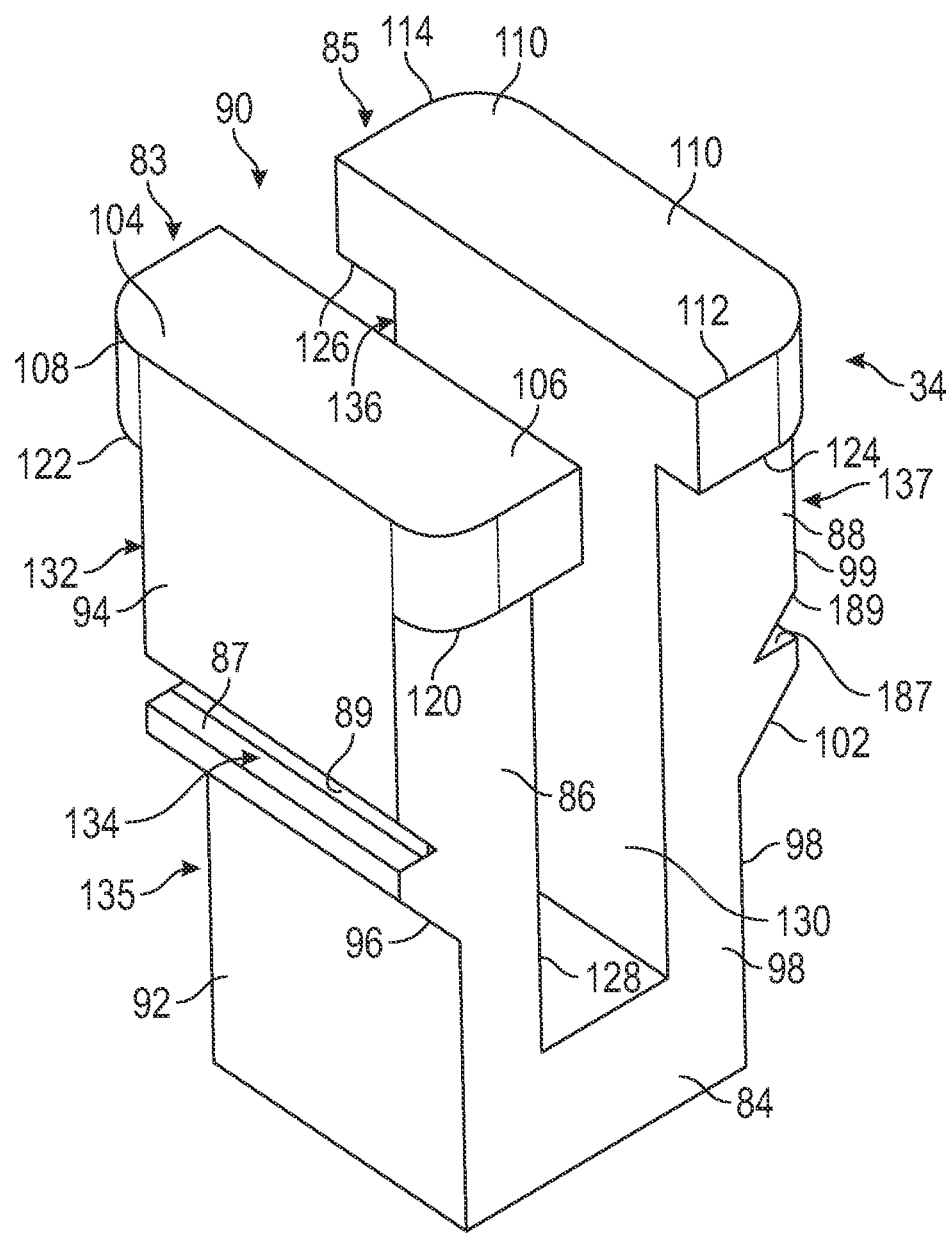
FIG. 3 is an enlarged view of the mobile anti-rotation feature or post shown in FIGS. 1-2 according to a number of variations.

FIGS. 1-3 illustrate a number of variations of the mobile anti-rotation feature or post 34. In a number of variations, the mobile anti-rotation feature or post 34 may be made of any of a number of materials, which may include a metal or a polymeric material. The mobile anti-rotation feature or post 34 may have a variety of configurations, which may have a U-shaped configuration. In a number of variations, the mobile anti-rotation feature or post 34 may include a base portion 84 and a first flexible finger 83 spaced apart from a second flexible finger 85, each extending from the base portion 84 to define a gap 90 therebetween. The mobile anti-rotation feature and the cavity in the bracket may have a variety of shapes, circular, start, square or any other suitable shape.

The first flexible finger 83 may include a first or front face 86 connected to an inner or second face 128 connected to a third or rear face 132 connected to a side or fourth face 135. The first flexible finger 83 may include a cap 104 at one end of the first flexible finger 83. The cap 104 may include a first end 106 extending past the first or front face 86 to form a first shoulder 120 adjacent to the first or front face 86. The cap 104 may include a second end 108 extending past the third or rear face 132 to form a second shoulder 122 adjacent to the third or rear face 132. The first shoulder 120 and second shoulder 122 may provide stop features for engaging a stop feature such as shoulder 56 on the base body portion 36. The fourth or side face 135 of the first flexible finger 83 may include a first side wall 92 extending from the base portion 84 and a second side wall 94 extending from the 104 of the first flexible finger 83. A first ramp 96 may extend inward from the second side wall 94 of the first flexible finger 83. A shoulder 87 may extend inward from the second side wall 94 and may meet a second ramp 89 extending inward from the second side wall 94, thereby defining a recess 134 in the second side wall 94. The shoulder 87 extending inward from the second side wall 94 and the second ramp 89 may engage one of a plurality of projections 222, 223 (shown in FIG. 4) extending from a surface at least partially defines at least one of the through holes 44, 46, 48, 50 formed in the base body portion 36 shown in FIGS. 1 and 2.

The second flexible finger 85 may include a first or front face 88 connected to an inner or second face 130 connected to a third or rear face 136 connected to a side or fourth face 137. The second flexible finger 85 may include a cap 110 at one end of the second flexible finger 85. The cap 110 may include a first end 112 extending past the first or front face 88 to form a first shoulder 124 adjacent to the first or front face 88. The cap 110 may include a second end 114 extending past the third or rear face 136 to form a second shoulder 126 adjacent to the third or rear face 132. The first shoulder 124 and second shoulder 126 may provide stop features for engaging a stop feature such as shoulder 56 on the base body portion 36. The fourth or side face 137 of the second flexible finger 85 may include a first side wall 98 extending from the base portion 84 and a second side wall 94 extending from the cap 110 of the second flexible finger 85. A first ramp 102 may extend from the first side wall 98 to the second side wall 99 of the first flexible finger 83. A shoulder 187 may extend inward from the second side wall 99 and may meet a second ramp 189 extending inward from the second side wall 99, thereby defining a recess 138 in the second side wall 99. The shoulder 187 extending inward from the second side wall 99 and the second ramp 189 may engage one of a plurality of projections 222, 223 (shown in FIG. 4) in a surface at least partially defining at least one of the through holes 44, 46, 48, 50 formed in the base body portion 36 shown in FIGS. 1 and 2.

FIGS. 1-4 illustrate a number of variations, which may include, depending upon the location and orientation of a support or frame in a vehicle, the mobile anti-rotation feature or post 34 may be inserted into one of the through holes, for example, through hole 44, 46, 48 or 50 extending through the base body portion 36 so that the first shoulder 120 and the second shoulder 122 formed by the cap 104 engages shoulders 56 and the second shoulder 87 and the second ramp 89 engage one of the plurality of projections 222, 223 defining at least in part one of the plurality of through holes 44, 46, 48 or 50; and wherein the first shoulder 124 and the second shoulder 126 formed by the cap 110 engages one of the plurality of shoulders 56 and the second shoulder 187 and the second ramp 189 of the second flexible finger 85 engage one of the plurality of projections 222, 223 defining at least in part one of the plurality of through holes 44, 46, 48 or 50.

Figure 4:
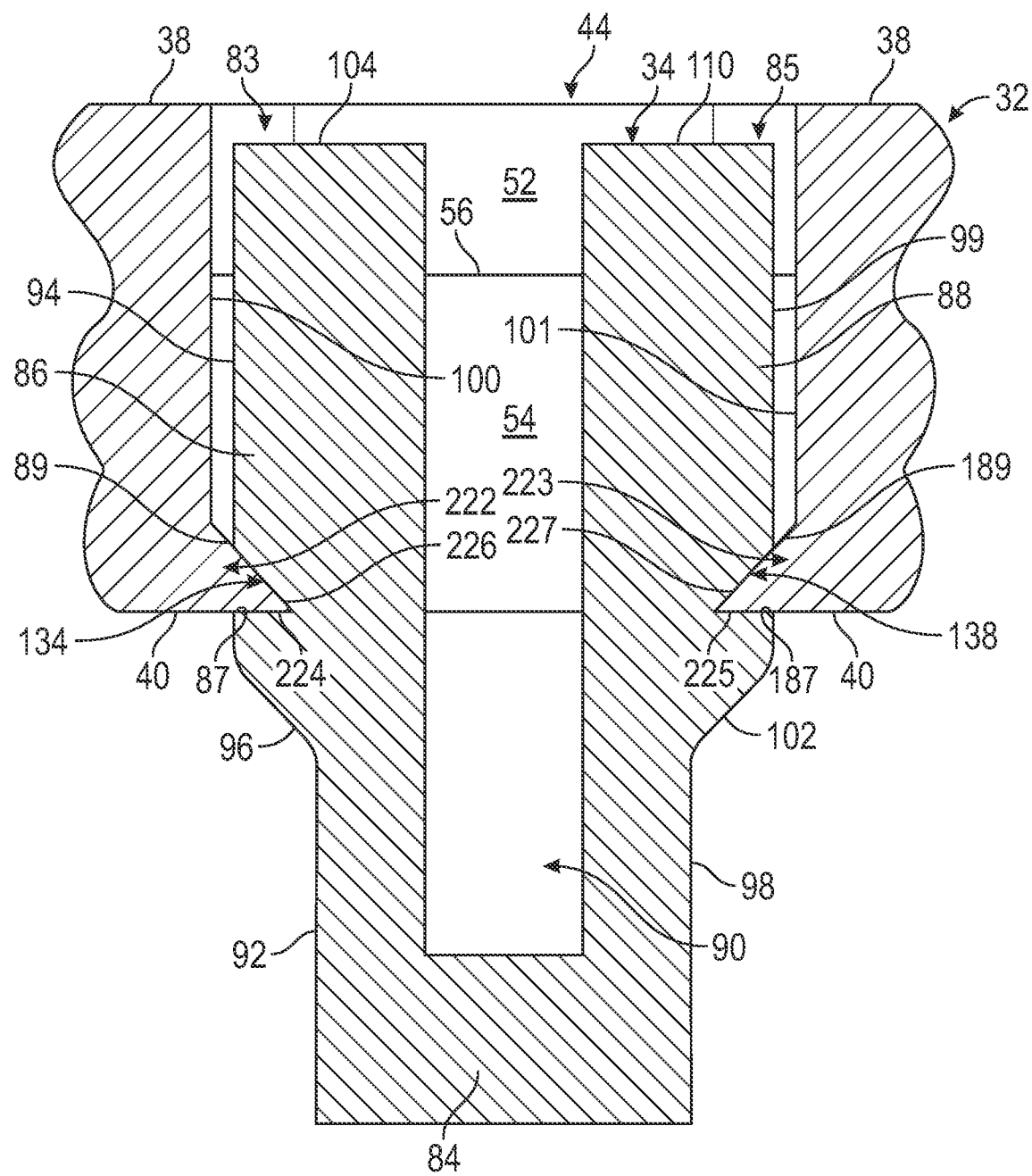
FIG. 4 is an enlarged sectional view of the mobile anti-rotation feature received in a through hole formed in the base body portion according to a number of variations.

FIG. 4 illustrates a number of variations. In a number of variations, the mobile anti-rotation feature or post 34 may be received in one of the through holes, for example, through hole 44 of the base body portion 36. Through hole 44, similar to the other through holes 46, 48, and 50, may be defined at least in part by the first 52, the second wall 54 and the shoulder 56 extending therebetween, a third wall 100 and an opposite fourth wall 101 each joining the first wall 52 and the second wall 54. The third wall 100 may include a projection 222 extending inward and may be formed in part by a sloped surface 226 extending towards and meeting the bottom face 40 of the base body portion 36. The projection 222 of the third wall 100 may be received in the recess 134 formed in the second side wall 94 of the first flexible finger 83 so that the projection 222 locks against the second ramp 89 and the shoulder 87, defining the recess 134 of the first flexible finger 83. Similarly, the fourth wall 101 may include a projection 223 extending inwardly and may be formed in part by a sloped surface 227 extending toward and meeting the bottom face 40 of the base body portion 36. The projection 223 of the fourth wall 101 may be received in the recess 138 formed in the second side wall 99 of the second flexible finger 85 so that the projection 223 locks against the second ramp 189 and the second shoulder 187 defining the recess 138 of the second flexible finger 85.

Figure 5:
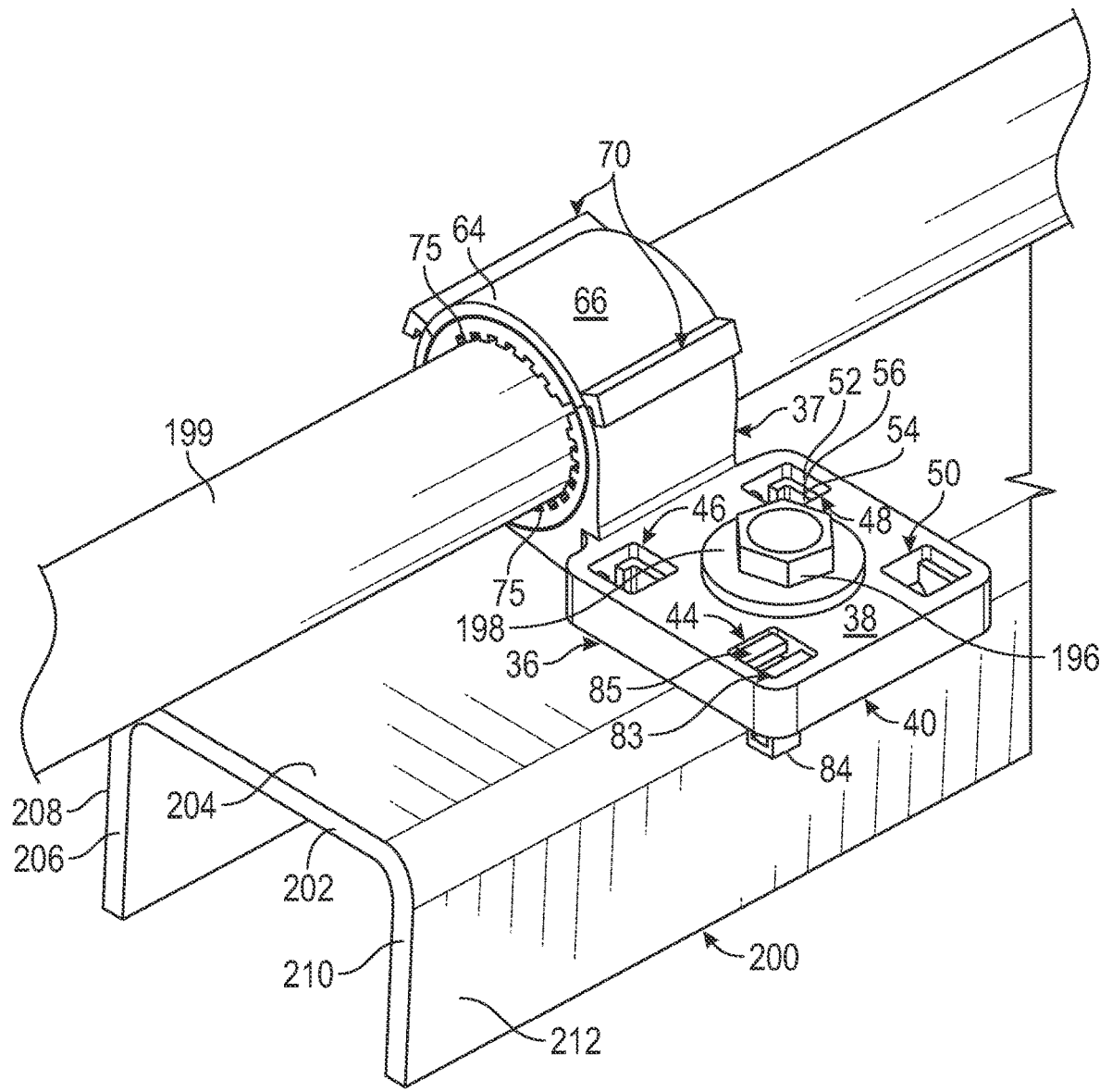
FIG. 5 is a perspective view of a base body bracket secured to a support or frame of a vehicle with a pipe or conduit received in the bracket portion and the mobile anti-rotation feature or post engaging the support or frame of the vehicle according to a number of variations.

FIG. 5 illustrates a number of variations, which may include a pipe or conduit 199 received in the bracket portion 37 and wherein at least the base portion 84 of the mobile anti-rotation feature or post 34 engages a vehicle component 200 to prevent rotation of the bracket portion 37, the pipe or conduit 199 held thereby, and the base body portion 36. In a number of variations, the vehicle component 200 may include a frame or support that may have a top wall 202 joining a first side rail 206 and a spaced apart second rail 210, each extending perpendicularly from the top wall 202. The top wall 202 may include a top face 204. The first side rail 206 may include a first outer face 208, and the second rail 210 may include a second outer face 212. A bolt 196 may extend through a washer 198, through hole defined by the inner surface 62 of the bushing 60 received in the through hole defined by wall 58, the base body portion 36 (best seen in FIGS. 1-2), and through a through hole in the top wall 202.

Figure 6:
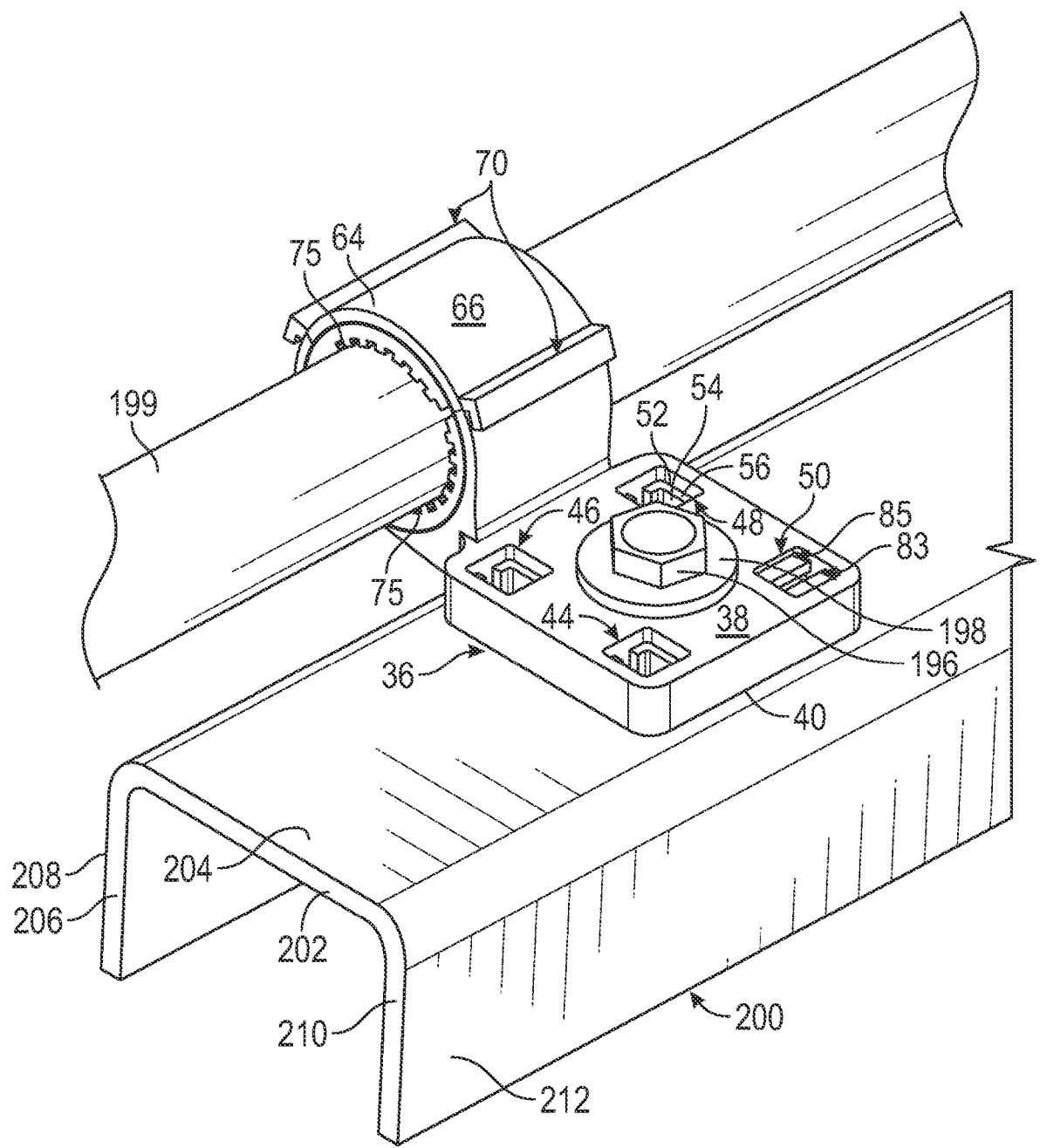
FIG. 6 is perspective view of a base body bracket secured to a support or frame of a vehicle with a pipe or conduit received in the bracket portion and the mobile anti-rotation feature or post extending through the support or frame of the vehicle according to a number of variations.
Figure 7:
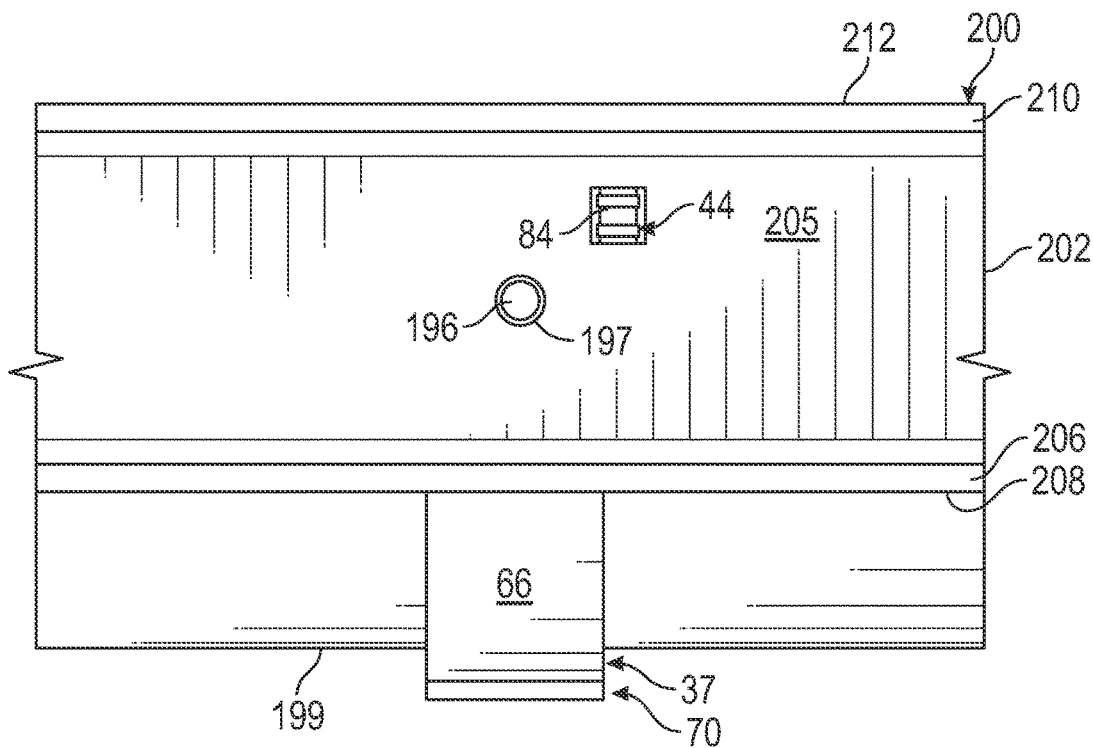
FIG. 7 is a bottom view of FIG. 6 according to a number of variations.
Figure 8:
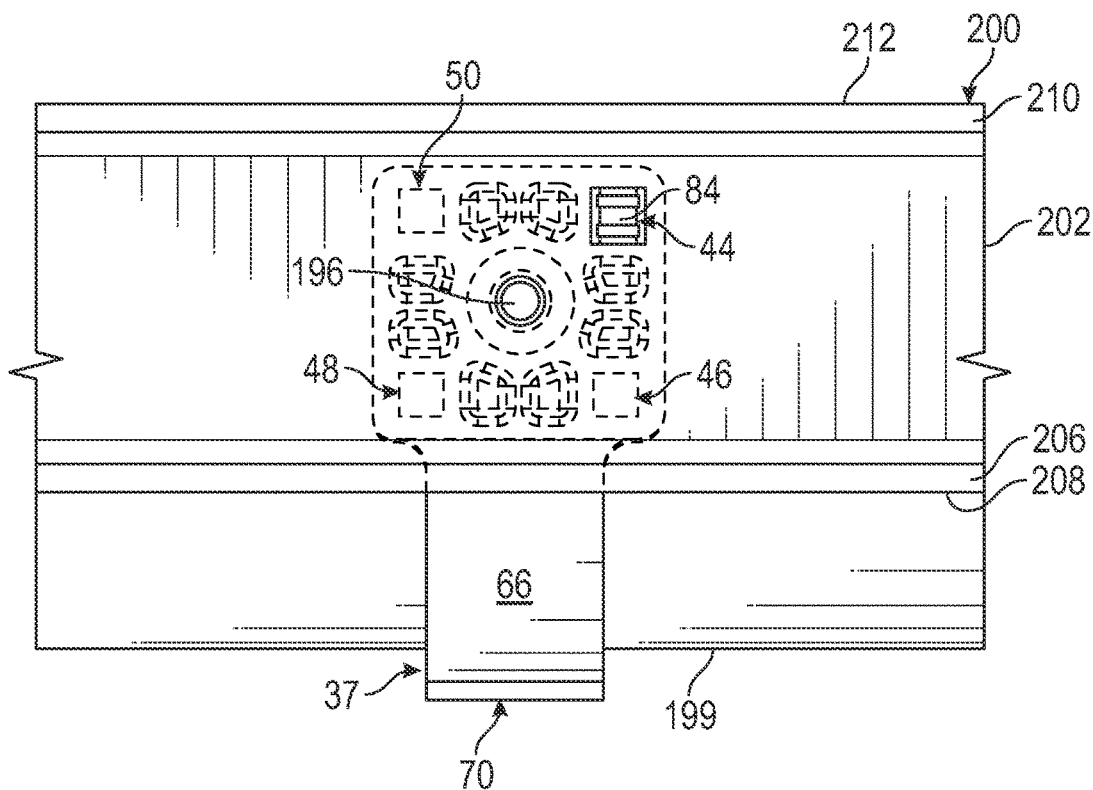
FIG. 8 is a bottom view of FIG. 6 with the base body portion shown in phantom lines according to a number of variations.

FIGS. 6-8 illustrate a number of variations, wherein the top wall 202 may include a first through hole 203 for receiving a portion of the mobile anti-rotation feature or post 34 so that the base portion 84 extends below a bottom face 205 of the top wall 202 of the support or frame 200. A second through hole 197 may be formed in the top wall 202 and may be threaded. The bolt 196 may extend through the second through hole 197. The bolt 196 may include a threaded portion engaging treads that may define second through hole 197.

In a number of variations, a method including providing a plurality of identical sets of the base body bracket 32 and the mobile anti-rotation feature or post 34 and placing individual sets at different spaced apart positions along a pipe or conduit 199 of any of a variety of vehicle systems including, but not limited to, a cooling system, or placing a first set of the plurality of identical sets of the base body bracket 32 and the mobile anti-rotation feature or post 34 at a position along a pipe or conduit 199 of a first model of a first vehicle and placing a second set of the plurality of identical sets of base body bracket and mobile anti-rotation feature or post 34 along a pipe or conduit 199 of a second model of a second vehicle, wherein the first model and the second model are different. In a number of variations, the plurality of identical sets a first base body bracket and a first mobile anti-rotation feature post, and a second base body bracket and a second mobile anti-rotation feature or post, wherein each base body bracket includes at least a first through hole and a second through hole 46 formed therein, and wherein the different spaced apart positions along the pipe or conduit 199 includes a first position and a second position, and wherein the first mobile anti-rotation feature or post 34 extends through the first through hole of a first base body bracket and the second mobile anti-rotation feature or post extends through the second through hole of a second base body bracket.

While at least one illustrative variation has been presented in the foregoing detailed description, it should be appreciated that a vast number of variations exist. It should also be appreciated that the variations are only examples, and are not intended to limit the scope, applicability, or configuration of the disclosure in any way. Rather, the foregoing detailed description will provide those skilled in the art with a convenient road map for implementing the variations. It should be understood that various changes can be made in the function and arrangement of elements without departing from the scope of the disclosure as set forth in the appended claims and the legal equivalents thereof.

What is claimed is:

1. A product comprising:
   a bracket comprising at least two separate parts comprising a base body bracket and a mobile anti-rotation feature or a post, wherein the base body bracket comprises a base body portion and a bracket portion, and wherein the base body portion includes a plurality of through holes formed therein, wherein the plurality of through holes includes at least three through holes, and wherein the mobile anti-rotation feature or the post is constructed and arranged to be received in one of the plurality of through holes depending upon a mounting location of the bracket, wherein the base body portion includes a first shoulder formed in a first surface defining one of the plurality of through holes positioned for engagement with a second shoulder of the mobile anti-rotation feature or the post.

2. The product as set forth in claim 1 wherein the base body portion includes a top face and opposite bottom face and a side extending therebetween, wherein the mobile anti-rotation feature or the post is received in one of the plurality of through holes extends downwardly so that a portion of the mobile anti-rotation feature extends downwardly below the opposite bottom face of the base body portion, wherein the base body portion includes at least three corners each having one through hole of the at least three through holes.

3. The product as set for in claim 2 wherein a first outer edge of the top face and a second outer edge of the opposite bottom face each have a square shape, rectangle shape, rhombus shape, disc or circle shape, or elliptical shape.

4. The product as set forth in claim 1 wherein the base body portion includes a second surface defining at least in part one of the at least three through holes and forming at least one stop feature positioned to engage a stop feature on the mobile anti-rotation feature or the post, or a first locking feature to mate with a second locking feature on the mobile anti-rotation feature or the post.

5. The product as set forth in claim 1 wherein the bracket portion includes an outer shell and an inner shell, and wherein the inner shell has a through hole formed therein for receiving a pipe or conduit.

6. The product as set forth in claim 5 wherein the outer shell includes a plurality of arc-shaped segments, and at least one projection comprising a fin radially outward from one of the plurality of arc-shaped segments and a flange extending perpendicularly to the fin.

7. The product as set forth in claim 6 wherein the inner shell includes an inner surface having a plurality of ribs, wherein the plurality of ribs includes spaced apart ribs that have a valley between adjacent ribs.

8. The product as set forth in claim 1 wherein the bracket portion comprises two pieces including a first piece and a second piece so that a pipe or a conduit is receivable in the first piece, and the second piece is connectable to the first piece to securely hold the pipe or the conduit.

9. The product as set forth in claim 8 wherein the first piece and the second piece are connectable by at least one of locking features, adhesive, or welding.

10. The product as set forth in claim 1 wherein the mobile anti-rotation feature or the post comprises a base portion and a first flexible finger and a second flexible finger extending from the base portion, wherein the first flexible finger and the second flexible finger are spaced from each other to define a gap therebetween.

11. The product as set forth in claim 10 wherein each of the first flexible finger and the second flexible finger has a front face connected to an inner face connected to a rear face connected to a side face, and each of the first flexible finger and the second flexible finger comprises a cap having a first end extending past the front face to form a third shoulder and the cap having a second end extending past the rear face to form a fourth shoulder.

12. The product is set forth in claim 10 wherein a shoulder formed in a second surface defining one of the plurality of through holes is sloped and is positioned for engagement with one of the shoulder of the first flexible finger or the shoulder of the second flexible finger, wherein the plurality of through holes includes at least four through holes, wherein the base body portion includes at least four corners each having one through hole of the at least four through holes formed therein.

13. The product as set forth in claim 1 wherein the mobile anti-rotation feature or the post and the base body portion include mating locking features so that the mobile anti-rotation feature or the post is lockable in position with respect to the base body portion.

14. A product comprising:
   a bracket comprising at least two separate parts comprising a base body bracket and a mobile anti-rotation feature or post, wherein the base body bracket comprises a base body portion and a bracket portion, and wherein the base body portion includes a plurality of through holes formed therein, and wherein the mobile anti-rotation feature or the post is constructed and arranged to be received in one of the plurality of through holes depending upon a mounting location of the bracket;
   wherein the base body portion includes first shoulder formed in a surface defining one of the plurality of through holes and includes a first sloped surface positioned for engagement with a second sloped surface of second shoulder of the mobile anti-rotation feature or post;
   a component of a vehicle received in, supported, or held by the bracket portion, and a vehicle support or a vehicle frame, and wherein the mobile anti-rotation feature or the post is positioned in one of the plurality of through holes, wherein a portion of the mobile anti-rotation feature or the post engages a face of the vehicle support or the vehicle frame, or extends through the vehicle support or the vehicle frame, wherein the plurality of through holes includes at least four through holes, wherein the base body portion includes at least four corners each having one through hole of the at least four through holes formed therein.

15. A method comprising:
   providing a plurality of identical sets of a base body portion and a mobile anti-rotation feature or a post and placing individual sets at different spaced apart positions along a component of a vehicle system, or placing a first set of the plurality of identical sets of the base body portion and the mobile anti-rotation feature or the post at a position along a component of a first model of a first vehicle and placing a second set of the plurality of identical sets of the base body portion and the mobile anti-rotation feature or the post along another component of a second model of a second vehicle, wherein the first model and the second model are different, wherein the mobile anti-rotation feature or the post comprises a base portion and a first flexible finger and a second flexible finger extending from the base portion, wherein the first flexible finger and the second flexible finger are spaced from each other to define a gap therebetween.

16. The method as set forth in claim 15 wherein the base body portion includes a top face and opposite bottom face and a side extending therebetween, wherein the mobile anti-rotation feature or the post is received in one through hole of a plurality of through holes formed in the base body portion and extends downwardly so that a portion of the mobile anti-rotation feature extends below the opposite bottom face of the base body portion.

17. The method as set forth in claim 15 wherein the base body portion includes a surface defining at least in part one through hole of a plurality of through holes and forming at least one of a stop feature position to engage a stop feature on the mobile anti-rotation feature or the post, or a first locking feature to mate with a second locking feature on the mobile anti-rotation feature or the post.

18. The method as set forth in claim 15 wherein the base body portion includes an outer shell and an inner shell, and wherein the inner shell has a through hole formed therein for receiving a pipe or conduit.

19. The method as set forth in claim 15 wherein the base body portion comprises two pieces including a first piece and a second piece so that a pipe or a conduit is receivable in the first piece, and the second piece is connectable to the first piece to securely hold the pipe or the conduit.

20. The method as set forth in claim 15 wherein the base body portion includes a first shoulder formed in a surface defining one of a plurality of through holes positioned for engagement with a second shoulder of the mobile anti-rotation feature or the post.

* * * * *